(12) United States Patent
Ziemer

(10) Patent No.: US 9,011,284 B2
(45) Date of Patent: Apr. 21, 2015

(54) HYBRID POWER TRAIN FOR A MOTOR VEHICLE

(71) Applicant: ZF Friedrichshafen AG, Friedrichshafen (DE)

(72) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 128 days.

(21) Appl. No.: 13/754,831

(22) Filed: Jan. 30, 2013

(65) Prior Publication Data

US 2013/0196810 A1    Aug. 1, 2013

(30) Foreign Application Priority Data

Jan. 31, 2012 (DE) .......................... 10 2012 201 376

(51) Int. Cl.
| | |
|---|---|
| *F16H 3/72* | (2006.01) |
| *F16H 37/06* | (2006.01) |
| *B60K 6/365* | (2007.10) |
| *B60K 6/547* | (2007.10) |
| *B60K 6/442* | (2007.10) |
| *B60K 6/445* | (2007.10) |

(Continued)

(52) U.S. Cl.
CPC ............. *F16H 37/065* (2013.01); *B60K 6/365* (2013.01); *B60K 6/547* (2013.01); *F16H 3/725* (2013.01); *B60K 6/442* (2013.01); *B60K 6/445* (2013.01); *F16H 2200/0073* (2013.01); *F16H 2200/2012* (2013.01); *F16H 2200/2046* (2013.01); *F16H 2037/0886* (2013.01); *F16H 2200/2064* (2013.01); *F16H 3/66* (2013.01)

(58) Field of Classification Search
CPC ................................................ F16H 2200/0021
USPC ............................. 475/1–10; 180/65.6, 65.7
See application file for complete search history.

(56) References Cited

U.S. PATENT DOCUMENTS

| | | | |
|---|---|---|---|
| 5,106,352 A | 4/1992 | Lepelletier | |
| 7,905,807 B2 * | 3/2011 | Shimizu et al. | .................... 475/5 |

(Continued)

FOREIGN PATENT DOCUMENTS

| | | |
|---|---|---|
| DE | 10 2008 051 305 A1 | 12/2009 |
| DE | 10 2010 028 026 | 10/2011 |

(Continued)

OTHER PUBLICATIONS

German Search Report from corresponding DE Application No. 10 2012 201 376.8, dated Mar. 27, 2014 (German Language) (5 pages).

*Primary Examiner* — Tisha Lewis
(74) *Attorney, Agent, or Firm* — Brinks Gilson & Lione

(57) ABSTRACT

A transmission comprises a transmission input shaft, a transmission output shaft, and three power paths situated between the transmission input shaft and a main gear set. The main gear set comprises two single planetary gear sets a first, a second, a third and a fourth shafts. An electric motor is connected with at least one of the four shafts. The first shaft can be connected with the first power path via a first switching element and with the third power path via a second switching element. The second shaft can be connected with the first power path via a third switching element and with the third power path via a fourth switching element. The third shaft is constantly connected with the transmission output shaft. The fourth shaft can be connected with the second power path via a fifth switching element and can be fixed by a sixth switching element.

19 Claims, 5 Drawing Sheets

(51) Int. Cl.
*F16H 37/08* (2006.01)
*F16H 3/66* (2006.01)

(56) References Cited

U.S. PATENT DOCUMENTS

2014/0080653 A1\* 3/2014 Smetana ............... 475/150
2014/0106930 A1\* 4/2014 Smetana et al. ............... 477/35

FOREIGN PATENT DOCUMENTS

| DE | 102011007454 A1 | \* | 10/2012 |
| DE | 11 2007 000 612 B4 | | 6/2013 |
| EP | 0 434 525 A1 | | 6/1991 |
| EP | 2511570 A1 | \* | 10/2012 |

\* cited by examiner

| Gear | C | B | D | E | A | F | EM1+EM2 | Transmission | Gear Jump |
|---|---|---|---|---|---|---|---|---|---|
| 1VM | o |   |   |   |   | o | M/Rek | 7.50 |  |
| 2VM |   | o |   |   |   | o | M/Rek | 3.75 | 2.00 |
| 3VM |   |   | o |   |   | o | M/Rek | 2.50 | 1.50 |
| 4VM |   | o | o |   |   |   | M/Rek | 1.88 | 1.33 |
| 5VM | o |   | o |   |   |   | M/Rek | 1.50 | 1.25 |
| 6VM |   |   | o |   | o |   | M/Rek | 1.25 | 1.20 |
| 7VM | o |   |   |   | o |   | M/Rek | 1.07 | 1.17 |
| 8VM |   | o |   | o |   |   | M/Rek | 0.94 | 1.14 |
| 9VM |   |   |   | o | o |   | M/Rek | 0.83 | 1.12 |
| 10VM |   | o |   | o |   |   | M/Rek | 0.75 | 1.11 |
| 11VM | o |   |   |   |   |   | M/Rek | 0.68 | 1.10 |
| F/R Starting |   |   |   |   |   | o | EM1 | 5.00 |  |
| Motor-start | o |   |   |   |   |   | EM1, EM2 |  |  |
|  |   |   |   |   |   |   | EM1, EM2 |  |  |
|  |   |   |   |   |   |   | EM2 |  |  |

Transmission-ratio stored : 11.0

Parking brake

Fig. 3

| Gear | K0 | K1 | C | B | D | E | A | F | EM1, EM2 | Transmission | Gear Jump |
|---|---|---|---|---|---|---|---|---|---|---|---|
| 1V/E | o/- | o | o | | | | | | M/Rek | 5.65 | 1.70 |
| 2V/E | o/- | o | | o | | | | o | M/Rek | 3.33 | 1.53 |
| 3V/E | o/- | o | | | o | | | o | M/Rek | 2.17 | 1.38 |
| 4V/E | o/- | o | | o | o | | | o | M/Rek | 1.58 | 1.21 |
| 5V/E | o/- | o | o | | o | | | | M/Rek | 1.30 | 1.12 |
| 6V/E | o/- | o | | | o | | o | | M/Rek | 1.16 | 1.10 |
| 7V/E | o/- | o | o | | | | o | | M/Rek | 1.06 | 1.13 |
| 8V/E | o/- | o | | o | | | o | | M/Rek | 0.93 | 1.10 |
| 9V/E | o/- | o | | | | o | o | | M/Rek | 0.85 | 1.10 |
| 10V/E | o/- | o | o | | | o | | | M/Rek | 0.77 | 1.10 |
| 11V/E | o/- | o | | o | | o | | | M/Rek | 0.70 | |
| F/R Starting | | o | o | | | | | o | EM1, EM2 | 5.65/4.33 | |
| Starting | o | o | | o | | | | | EM1, EM2 | | |
| | o | o | | | | | | | EM1, EM2 | | |
| Motor-start | o | | | | | | | | EM1 | | |

Transmission -ratio stored : 8.1

Parking brake

Fig. 5

HYBRID POWER TRAIN FOR A MOTOR VEHICLE

PRIORITY STATEMENT

The present application claims priority to Germany Patent Application No. DE 10 2012 201 376.8, filed Jan. 31, 2012, the disclosure of which is incorporated herein in its entirety by reference.

BACKGROUND

The invention concerns a transmission with a transmission input shaft and a transmission output shaft and three power paths situated between the transmission input shaft and a main gear set consisting of two single planetary gear sets having four shafts depicted in order of speed as the first, second, third, and fourth shafts.

Furthermore, the invention concerns a hybrid power train for a motor vehicle comprising at least one combustion engine and at least one electric motor.

For example, a transmission of the type mentioned at the start has been disclosed in EP 0 434 525 A1. In the well-known transmission, which comprises five switching elements of which the selective operation in pairs determines various transmission ratios between the input shaft and the output shaft, six forward gears and one reverse gear have been implemented.

The applicant's patent application DE 10 2010 028 026 introduced a hybrid power train with a combustion engine and several electric motors. These hybrid power trains use a gear drive with sub-transmissions, each of which comprises a switchable gear stage. Except for a direct gear in the coaxial drive and output, the respective switchable gear stages present in the sub-transmissions are generated by exactly one single gear, for example, a cylindrical gear pair or a planetary gear. As a result, an eleven-speed countershaft transmission with coaxial output would require for the eleven gears at least eleven single gears in the form of eleven cylindrical gear pairs.

It is therefore the object of the invention to reduce the construction costs required for a hybrid power train of the type mentioned above by providing a multi-speed transmission.

SUMMARY

According to the invention, this problem is solved with a multi-speed transmission of the type mentioned at the start in such a way that three power paths are provided between the transmission input shaft and the main gear set, wherein a first power path comprises a first fixed transmission ratio, a second power path a second fixed transmission ratio and a third power path a third transmission ratio, wherein the third transmission ratio is smaller than the second transmission ratio and the second transmission ratio is smaller than the first transmission ratio, wherein at least one electric motor is connected with at least one of the shafts of the main gear set, wherein the first shaft can be connected with the first power path via a first switching element and with the third power path via a second switching element, wherein the second shaft can be connected with the first power path via a third switching element and with the third power path via a fourth switching element, wherein the third shaft is constantly connected with the transmission output shaft, wherein the fourth shaft can be connected with the second power path via a fifth switching element and can be fixed by means of a sixth switching element.

In particular, the invention-based solution is characterized by a considerably less costly and simpler structure which would also result in an optimization of the total weight and the required installation space. Two switching elements, respectively, can be operated by means of a double-acting actuator. In the process, the closing of a first switching element can cause a second switching element to be opened. Preferably, all switching elements mentioned in this document can be designed as form-fit switching elements, for example, as claw switching elements, especially as jaw clutch or jaw brake. The invention-based transmission has the additional advantage that it is able to achieve a reduced gear jump progression. A reduced gear jump progression indicates that as the gears increase the gear jumps are becoming smaller. Furthermore, the switching elements used do not require a synchronizing system because a synchronization of the switching elements can take place in a load-free condition via the electric motor and a combustion engine. Moreover, the electric motor can be used as a speed sensor (resolver). As a result, it is possible to avoid undefined speed conditions at the planetary gear sets inside and outside of gear shifting because the speeds at the electric motor of the drive and output are always defined. Furthermore, a power shift via the electric motor can occur when using a combustion engine.

Preferably, the planetary gear used is designed as a minus planetary gear set. A simple minus planetary gear set comprises a sun gear, a ring gear and a planet carrier in which the planetary gears are swivel-mounted, each of which meshes with the sun gear and the ring gear. As a result, when the planet carrier is held in position, the ring gear and the sun gear have opposite rotational directions. A simple plus planetary gear set, on the other hand, comprises a sun gear, a ring gear and a planet carrier in which inside and outside planetary gears are swivel-mounted, wherein all inside planetary gears mesh with the sun gear, and all outside planetary gears mesh with the ring gear, wherein each insider planetary gear meshes with one outside planetary gear, respectively. As a result, when the planet carrier is held in position, the ring gear and the sun gear have the same rotational directions. However, according to the invention, a minus planetary gear set can be exchanged also with a plus planetary gear set when the planet carrier and ring gear connection are also replaced and the amount of the stationary ratio of the planetary gear set is increased when compared with the model of the minus planetary gear set.

In an example embodiment of the invention, igniting, starting, reversing, boosting, recuperating and power shifting take place by means of the electric motor. Said model provides that the electric motor is connected with the first shaft of the main gear set constantly or in On and Off switch mode, directly or by means of a transmission. Another advantage could be the fact that a separate reverse gear is not required.

One particular example embodiment of the invention operates with a small number of the required switching elements and prevents double switching when in sequential switching mode. Said example embodiment provides that it is possible to implement twelve forward gears by selectively engaging in pairs the six switching elements, wherein eleven of the twelve forward gears can be switched in power shifting mode and without range shifting, wherein the first forward gear can be connected by closing the sixth switching element and the first switching element, the second forward gear can be connected by closing the sixth switching element and the second switching element, the third forward gear can be connected by closing the sixth switching element and the third switching element, the fourth forward gear can be connected by closing the third switching element and the second switching element, the fifth forward gear can be connected by closing the third switching element and the first switching element, the sixth forward gear can be connected by closing the third switching element and the fifth switching element, the seventh forward gear can be connected by closing the first switching element and the fifth switching element, the eighth forward gear can be connected by closing the second switching element and the fifth switching element, the ninth forward gear can be connected by closing the fourth switching element and the fifth switching element, the tenth forward gear can be connected by closing the second switching element and the fourth switching element, the eleventh forward gear can be connected by closing the first switching element and the fourth switching element, and a further gear results from closing the sixth switching element and the fourth switching element.

One example embodiment provides that the gear output shaft is arranged coaxially to the transmission input shaft, wherein the first power path comprises a first planetary gear set for delivering a speed that is smaller than the speed of the transmission input shaft, wherein the first switching element and the third switching element are connected with a shaft of the first planetary gear set, wherein the second power path is a direct drive to which the fifth switching element is connected, wherein the third power path comprises a second planetary gear set for delivering a speed that is greater than the speed of the transmission input shaft, wherein the second switching element and the fourth switching element are connected to a shaft of the second planetary gear set, wherein the first and the second planetary gear sets are coupled twice, wherein at least one further shaft of the first and/or the second planetary gear set are fixed and at least one further shaft of the first and/or the second planetary gear set are connected with the transmission input shaft constantly or via a seventh switching element.

Preferably, the first planetary gear set involves a minus gear set designed as an underdrive planetary gear set, which comprises a fixed sun gear and a ring gear that is connected with a planet carrier of the second planetary gear set, wherein the first switching element and the third switching element are connected with a planet carrier of the first planetary gear set, wherein the second planetary gear set involves a minus gear set designed as an overdrive planetary gear set, which comprise a sun gear that is fixed and a planet carrier that is constantly connected with the transmission input shaft or that can be connected with the transmission input shaft via the seventh switching element, and which has a ring gear that is connected with the second switching element and the fourth switching element.

An example embodiment is characterized in that there are low torques in the switching elements and the planetary gear sets. In said example embodiment, the planet carrier of the first planetary gear can be detachably connected with a planet carrier of a first single planetary gear set of the main gear set via the third switching element, wherein the planet carrier of the first single planetary gear set of the main gear set is connected with a ring gear of the second single planetary gear set of the main gear set, and the ring gear of the second planetary gear set can be detachably connected with the planet carrier of the first single planetary gear set of the main gear set via the fourth switching element, and via the second switching element with a sun gear of the first single planetary gear set of the main gear set, and the planet carrier of the first planetary gear set can be detachably connected also with the sun gear of the first single planetary gear set of the main gear set, wherein the transmission input shaft can be detachably connected with a sun gear of the second single planetary gear set of the main gear set via the fifth switching element, wherein a planet carrier of the second single planetary gear set of the main gear set is constantly connected with the transmission output shaft and the sun gear of the second single planetary gear set of the main gear set can be fixed by means of the sixth switching element. Because of the low torques present in the switching elements and the planetary gear sets, this model of the invention allows for space-saving dimensions.

One model of the invention provides that a ring gear of the first single planetary gear set of the main gear set is connected with the sun gear of the second single planetary gear set of the main gear set.

However, according to an alternative example embodiment, it can also be provided that the ring gear of the first single planetary gear set of the main gear set is connected with the planet carrier of the second single planetary gear set of the main gear set.

The above-mentioned problem can also be solved by using a hybrid power train of the type mentioned at the start in such a way that it comprises a transmission according to example embodiments of the present application.

According to an additional example embodiment of the invention, it is possible to provide at least a second electric motor, preferably in the form of a starter or starter generator, that is detachably connected with the combustion engine directly or via a transmission or via at least an eighth switching element. This model of the invention has the advantage that when opening the eighth switching element a purely electric, load shiftable driving operation can be performed in all gears. Further advantages associated with this example embodiment are that it involves a battery size independent system allowing for an electric driving operation in combination with a combustion engine. It is also possible to use a generator operation for decelerating the combustion engine, especially when shifting from the first to the second or from the second to the third gear.

An especially simple and space-saving structure can be achieved when the first switching element and the second switching element and/or the third switching element and the fourth switching element and/or the fifth switching element and the sixth switching element and/or the seventh switching element and the eighth switching element can be operated through a double-acting actuator.

BRIEF DESCRIPTION OF THE DRAWINGS

Subsequently, the invention, including its advantages, is described in more detail by means of several non-restricting example embodiments, which are shown in the drawings. The drawings include the following diagrams:

FIG. 3 a circuit diagram for the transmission shown in FIG. 1 and FIG. 2;

DETAILED DESCRIPTION OF EXAMPLE EMBODIMENTS

Figure 1:
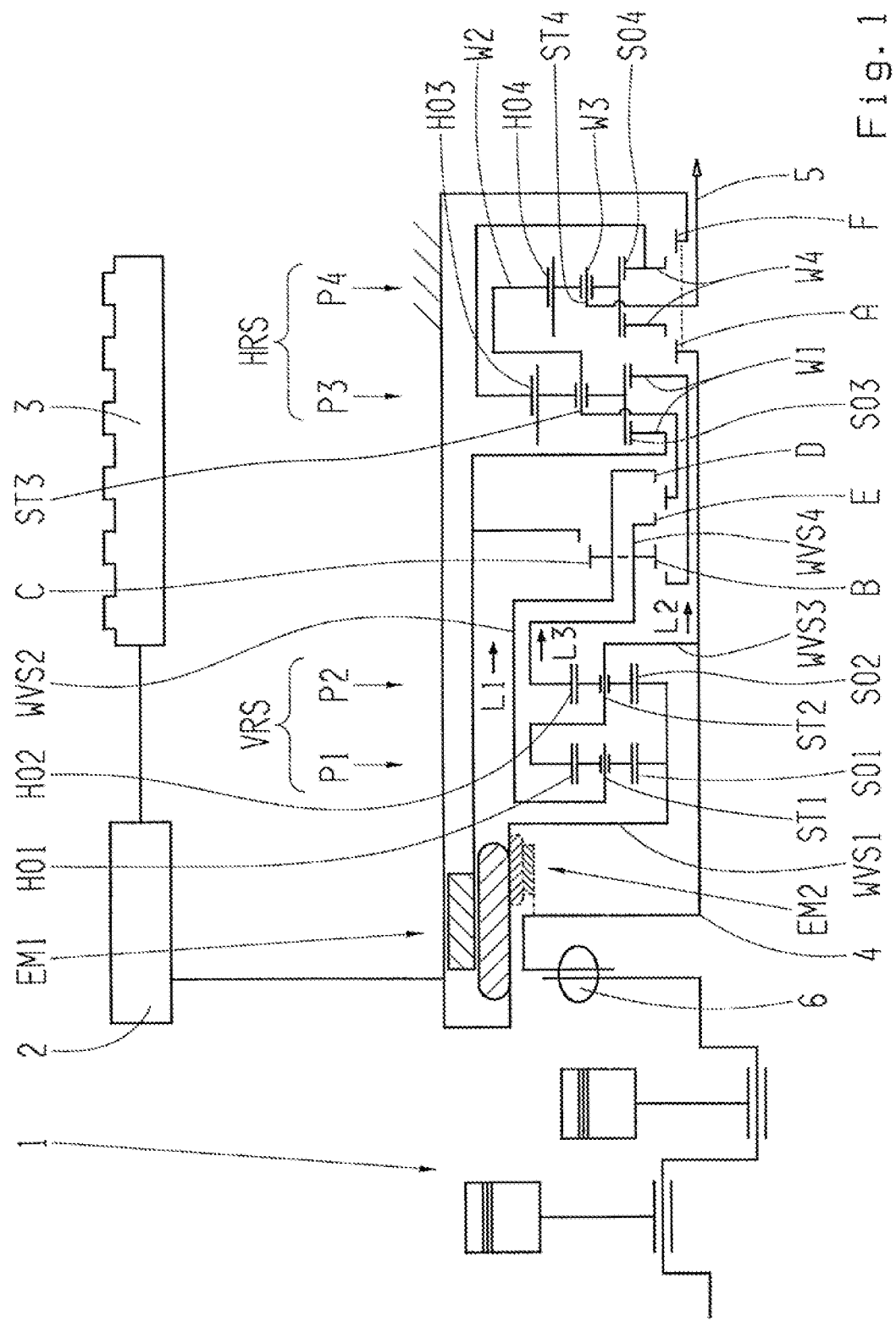
FIG. 1 a transmission diagram of a first example embodiment of an invention-based hybrid power train with an invention-based transmission.

First of all, it should be pointed out that in the description of the different example embodiments the same parts are provided with the same reference numerals, wherein the disclosures included in the entire description can be transferred correspondingly to the same parts with the same reference numerals or the same component names.

According to FIG. 1, an invention-based hybrid power train for a motor vehicle comprises a combustion engine 1 and at least one electric motor EM 1. In addition, it is possible to provide a control system 2 for the electric motor EM1 and an electric energy storage device 3.

The hybrid power train comprises an invention-based transmission with a transmission input shaft 4 and a transmission output shaft 5. For vibration damping between the combustion engine 1 and the transmission a torsional vibration damper 6 can be provided. Furthermore, it is possible to provide a second electric motor EM2, for example, in the form of a starter or starter generator. On the side of the power train an axle differential and/or differential distribution can be arranged.

Figure 2:
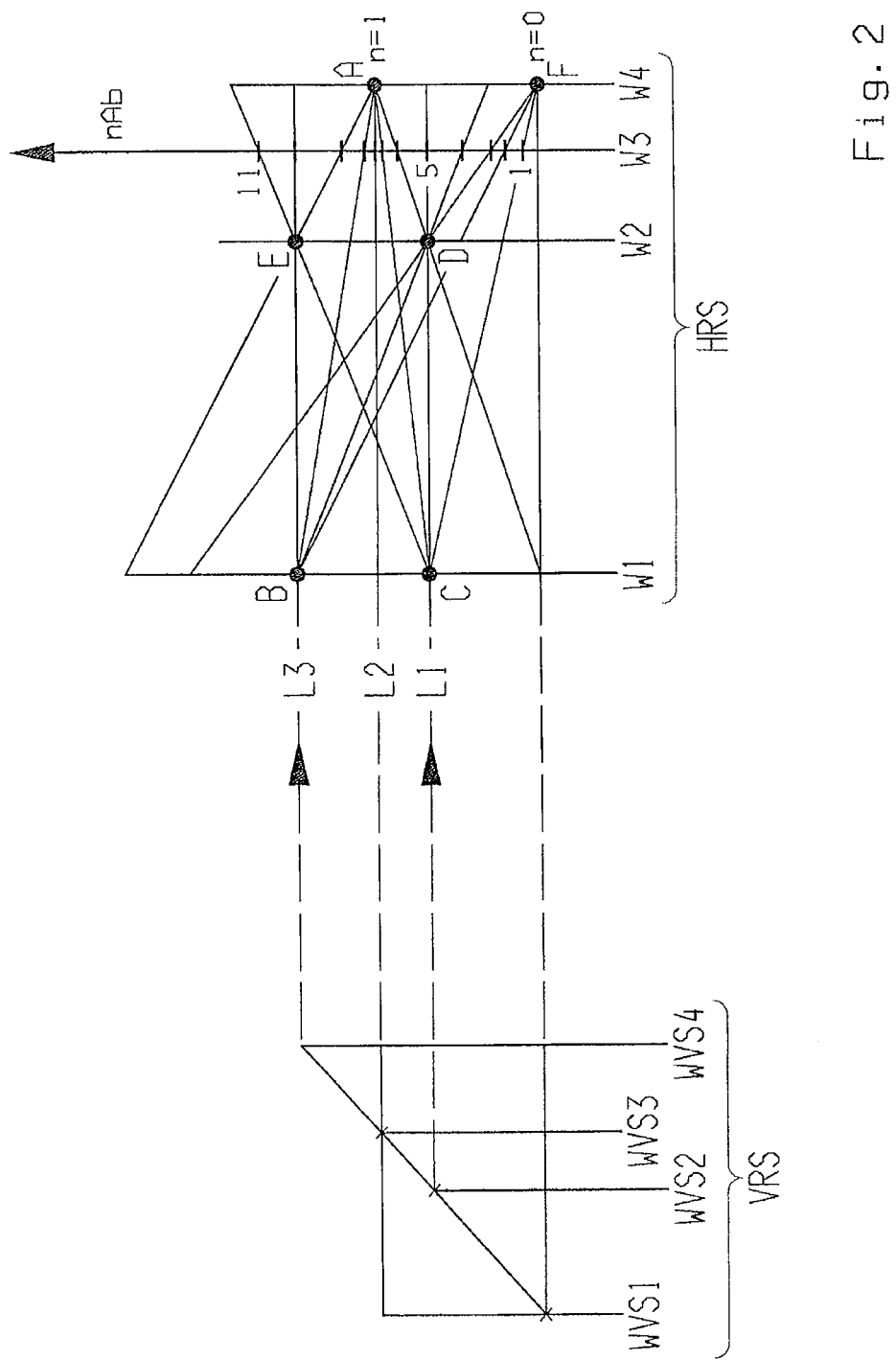
FIG. 2 a speed diagram of an invention-based transmission.

FIG. 1 and FIG. 2 show that three power paths L1, L2 and L3 have been implemented between the transmission input shaft 4 and a main gear set HRS consisting of two single planetary gear sets P3, P4. The three power paths L1, L2 and L3 represent three different transmission paths for the speeds transmitted from the transmission input shaft 4. The first power path L1 comprises a first fixed transmission ratio i1, the second power path L2 a second fixed transmission ration i2 and the third power path L3 a third fixed transmission ratio i3. The third transmission ratio i3 is smaller than the second transmission ration i2 and the second transmission ration is smaller than the first transmission ratio i1.

The main gear set HRS comprises four rotatable shafts W1, W2, W3, W4 which are depicted in order of speed as a first, a second, a third and a fourth shafts, respectively. The first shaft W1 can be connected with the first power path L1 via a first switching element C and with the third power path L3 via a second switching element B. The second shaft W2 can be connected with the first power path L1 via a fourth switching element. The third shaft W3 is constantly connected with the transmission output shaft 5. At this point, it should be mentioned that in the present text the terms "constantly" and "fixed" or "rotatably fixed" are used synonymously. FIG. 1 shows that the fourth shaft W4 can be connected with the second power path L2 via a fifth switching element A and can be fixed via a sixth switching element F.

The first shaft W1 of the main gear set HRD can be connected with a (divided) sun gear SO3 of the first single planetary gear set P3 of the main gear set HRS, wherein the second shaft W2 of the main gear set HRS is connected with a ring gear HO4 of the second single planetary gear set P4 of the main gear set HRS and a planet carrier ST3 of the first single planetary gear set P3 of the main gear set HRS. FIG. 1 shows that the third shaft W3 of the main gear set HRS can be connected with a planet carrier ST4 of the second single planetary gear set P4, while the fourth shaft W4 of the main gear set HRS can be connected with a (divided) sun gear SO4 of the second single planetary gear set P4 and a ring gear HO3 of the first single planetary gear set P3 of the main gear set HRS.

The electric motor EM1 can be constantly connected with the first shaft W1 of the main gear set HRS. However, as an alternative to the constant connection, the electric motor EM1 can be connected also with the first shaft W1 in On and Off switch mode, directly or by means of a transmission, in particular in belt or chain drive, spur or planetary gear. Basically, the electric motor EM1 could be also connected in switchable mode between the second shaft W2 and the fourth shaft W4. It would also be possible to connect the electric motor EM1 only at the second shaft W2 and to connect an additional electric motor at the fourth shaft W4 to ensure power shift selection.

Preferably, the transmission output shaft is arranged coaxially to the transmission input shaft 4. The main gear set has an upstream front-mounted gear set VRS consisting of two planetary gears P1, P2 with four shafts WVS1, WVS2, WVS3, WVS4, which are depicted in order of speed as a first, a second, a third, and a fourth shafts, respectively. According to FIG. 1, the first power path L1 can comprise the planetary gear set P1 of the front-mounted gear set VRS, wherein the first planetary gear set P1 is provided to deliver a speed that is smaller than the speed of the transmission input shaft 4. The first switching element C and the third switching element D are connected with a shaft WVS2 of the first planetary gear set P1, wherein the second power path L2 is a direct drive to which the fifth switching element A is connected.

The third power path L3 can comprise a second planetary gear set P2 for delivering a speed that is greater than the speed of the transmission input shaft 4, wherein the second switching element B and the fourth switching element E are connected with a shaft WVS4 of the second planetary gear set P2. The first and the second planetary gear sets P1, P2 are coupled twice, wherein a further shaft WVS1 of the front-mounted gear set VRS is fixed and a shaft WVS3 is connected with the transmission input shaft 4 constantly (shown in FIG. 1) or via a seventh switching element K1 (shown in FIG. 4).

The first planetary gear set P1 can involve a minus gear set designed as an underdrive planetary gear set, which comprises a fixed sun gear SO1 and a ring gear HO1 that is connected with a planet carrier ST2 of the second planetary gear set P2. The first switching element C and the second switching element D can be connected with a planet carrier ST1 of the first planetary gear set P1. The second planetary gear set P2 can involve a minus gear set designed as an overdrive planetary gear set, which comprises a sun gear SO2 that is also fixed and a planet carrier ST2 that is constantly connected with the transmission input shaft 4 or that can be connected with the transmission input shaft 4 via the seventh switching element K1, and which has a ring gear HO2 that is connected with the second switching element B and the fourth switching element E.

According to the example embodiment shown in FIG. 1, the planet carrier ST1 of the first planetary gear P1 can be connected with a planet carrier ST3 of the first single planetary gear set P3 of the main gear set HRS via the third switching element D. The planet carrier ST3 of the first single planetary gear set P3 can be connected with a ring gear HO4 of the second single planetary gear set P4 of the main gear set HRS. The ring gear HO2 of the second planetary gear set P2 can be connected with the planet carrier ST3 of the first single planetary gear set P3 via the fourth switching element E, and via a the second switching element B with a sun gear SO3 of the first single planetary gear set P3. Through the first switching element C, the planet carrier ST1 of the first planetary gear set P1 can also be connected with the sun gear SO3 of the first single planetary gear set P3. The transmission input shaft 4 can be connected with a sun gear SO4 of the single planetary gear set P4 via the fifth switching element A, wherein a planet carrier ST4 of the single planetary gear set P4 is constantly connected with the transmission output shaft 5 and the sun gear SO4 of the single planetary gear set P4 can be fixed by means of the sixth switching element F. FIG. 1 shows that the ring gear HO3 of the single planetary gear set P3 can be connected with the sun gear SO4 of the single planetary gear set P4.

At this point, it should be mentioned that, as an alternative to the example embodiment shown in FIG. 1, the first power path L1 can also involve a direct drive to which the first switching element C and the third switching element D are connected. In this case, the second power path L2 can comprise a planetary gear set P1 which is designed to deliver a speed that is greater than the transmission input shaft 4. In this example embodiment, the third shaft WVS3 can be connected with the ring gear HO1, the sun gear SO1 or the planet carrier ST1 of the planetary gear set P1, wherein the fifth switching element A is connected with the third shaft WVS3. At the same time, the third power path L3 can comprise a planetary gear set P2 for delivering a speed that is greater than the speed at the second power path L2. The fourth shaft WVS4 can be connected with the ring gear HO2, the sun gear SO2 or with the planet carrier ST2 of the planetary gear set P2, wherein the second switching element B and the fourth switching element E are connected with the fourth shaft WVS4. Both planetary gear sets P1 and P2 are coupled twice, wherein the first shaft WVS1, which is connected at least with one of the elements SO1, HO1, ST1, SO2, HO2 or ST2, is fixed, wherein the second shaft WVS2, which is connected at least with one of the elements SO1, HO1, ST1, SO2, HO2, ST2, is connected with the transmission input shaft 4 constantly or via the switching element K1. For example, the two planetary gear sets P1, P2 are minus gear sets that fix their respective sun gears SO1, SO2 and their planet carriers ST1, ST2 with the transmission input shaft 4 constantly or over the associated switching element K1.

As an alternative to the example embodiments described above, the third power path L3 can involve a direct drive to which the second switching element B and the fourth switching element E are connected. In the process, the second power path L2 can comprise a planetary gear set P2 for delivering a speed that is smaller than the speed of the transmission input shaft 4. In this example embodiment, the third shaft WVS3 can be connected with the ring gear HO2, the sun gear SO2 or the planet carrier ST2 of the planetary gear set P2, wherein the fifth switching element A is connected with the third shaft WVS3. In this example embodiment, the first power path L1 can comprise a planetary gear set P1. In the process, the second shaft WVS2 can be connected with the ring gear HO1, the sun gear SO1 or the planet carrier ST1 of the planetary gear set P1, wherein the first switching element C and the third switching element D are connected with the second shaft WVS2. Both planetary gear sets P1 and P2 are coupled twice, wherein the first shaft WVS1, which is connected at least with one of the elements SO1, HO1, ST1, SO2, HO2 or ST2, is fixed, wherein the fourth shaft WVS4, which is connected at least with one of the elements SO1, HO1, ST1, SO2, HO2, ST2, is connected with the transmission input shaft 4 constantly or via the switching element K1. A fitting example for this would be a plus gear set P2 and a minus gear set P1, which have sun gears SO1, SO2 that are fixed, wherein the planet carrier ST2 of the plus gear set P2 is connected with the transmission input shaft 4 constantly or via the switching element K1 and the ring gear HO1 of the minus gear set P1 is coupled with the planet carrier ST2 of the plus gear set P2.

By selectively engaging in pairs the six switching elements A, B, C, D, E, F of the transmission, it is possible to implement twelve forward gears, wherein eleven of the twelve forward gears can be switched in power shifting mode and without range shifting. In the present context, the term "can be switched without range shifting" means that only one switching element is opened and a different one is closed when shifting to the next higher or next lower gear.

The speed diagram or speed plan shown in FIG. 2 demonstrates the relationships between the gears attained by selectively engaging the switching elements A, B, C, D, E, F and the transmission ratio of each shaft W1, W2, W3, W4. The speed rations are applied in vertical direction to the individual shafts W1, W2, W3, W4. The horizontal distance between the shafts results from the transmission ratio so that speed ratios associated with a specific operating point can be connected through a straight line. In a specific drive speed, the eleven operating lines of the main gear set HRS mark the speed ratios in eleven forward gears.

FIG. 3 shows an exemplary circuit diagram for the multi-speed transmission depicted in FIG. 1. Two switching elements are closed for each gear. The circuit diagram indicates in an exemplary manner the respective transmissions of the individual gear stages and the gear jumps to the next higher gear to be determined, wherein the transmission comprises a transmission-ratio spread of 11.0. FIG. 3 shows that it is possible with a sequential shifting mode to prevent double shifting and range shift operations because two adjoining gear stages share one switching element. Typical values for stationary gear ratios of the planetary gears P1, P2, P3 and P4 designed in the present case as minus planetary gear sets are −2.0 for P1, −3.0 for P2, −2.0 for P3 and −1.5 for P4.

A first forward gear results from closing the sixth switching element F and the first switching element C, the second forward gear results from closing the sixth switching element F and the second switching element B, the third forward gear results from closing the sixth switching element F and the third switching element B, the fourth forward gear results from closing the third switching element D and the second switching element B, the fifth forward gear results from closing the third switching element D and the first switching element C, the sixth forward gear results from closing the third switching element D and the fifth switching element A, the seventh forward gear results from closing the first switching element C and the fifth switching element A, the eighth forward gear results from closing the second switching element F and the fifth switching element A, the ninth forward gear results from closing the fourth switching element E and the fifth switching element B, the tenth forward gear results from closing the second switching element B and the fourth switching element E, the eleventh forward gear results from closing the first switching element C and the fourth switching element E. An additional gear results from closing the sixth switching element F and the fourth switching element E. According to the transmissions shown in FIG. 3, the first gear can be used as crawling speed.

Purely electrical driving operations result from closing the sixth switching element F and opening the first, second, third, fourth and fifth switching elements A, B, C, D, E.

Figure 4:
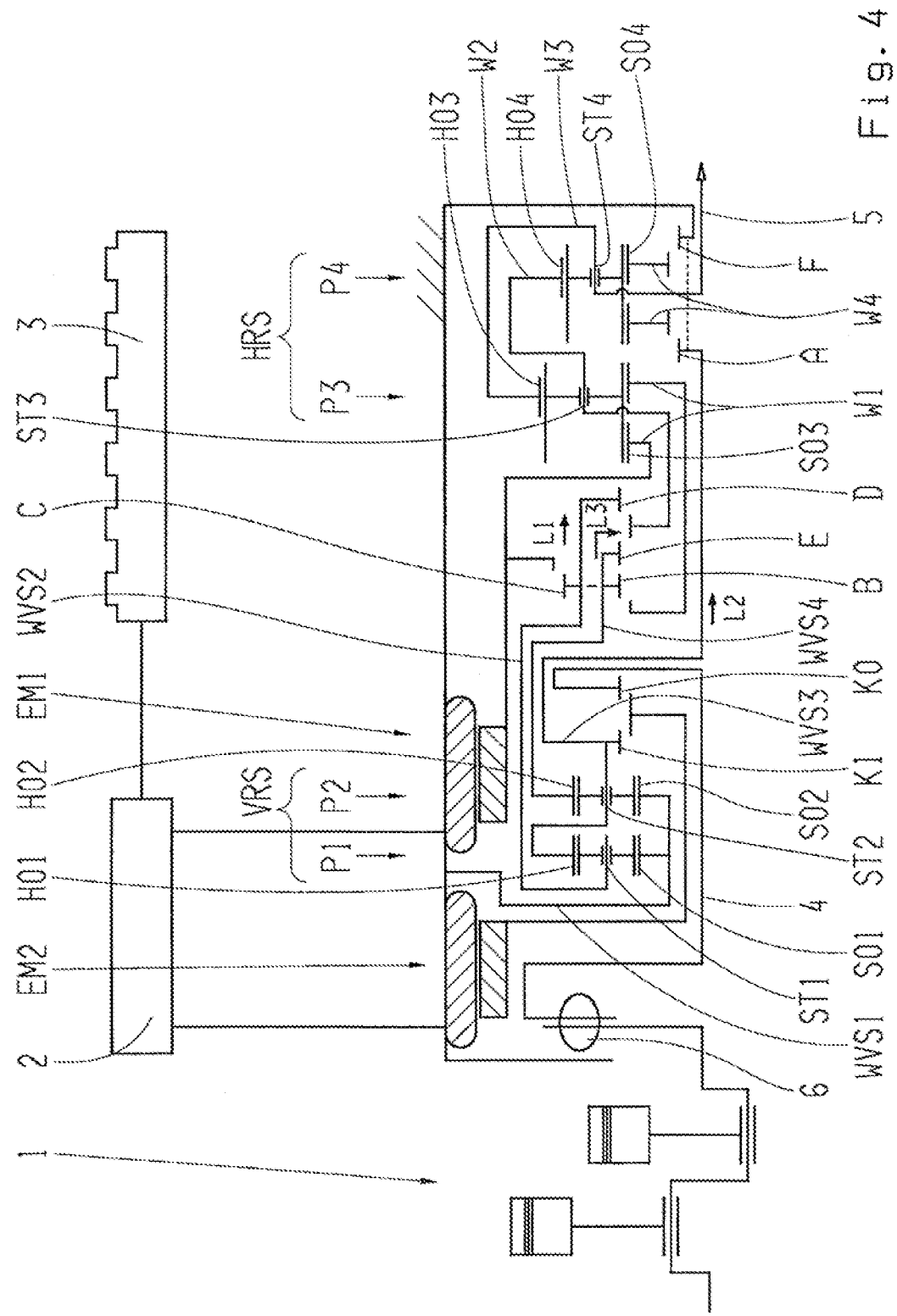
FIG. 4 a transmission diagram of a second example embodiment of an invention-based hybrid power train with an invention-based transmission, and FIG. 5 a circuit diagram for the hybrid power train shown in FIG. 4.

As an alternative to the example embodiment shown in FIG. 1, FIG. 4 shows that the ring gear HO3 of the first single planetary gear set P3 can be connected with the planet carrier ST4 of the second single planetary gear set P4 of the main gear set HRS.

As can be understood from FIG. 4, the second electric machine EM2, preferably in the form of a starter or starter-generator, can be connected to the internal combustion engine 1 via an eighth switching element K0.

FIG. 5 shows an exemplary circuit diagram for the hybrid power train shown in FIG. 4. For each gear in electrical driving operations that can also be used in power shift mode three switching element are closed while the switching element K0 is opened. When the switching element K0 is closed and the switching element K1 is opened we deal with an electric driving operation in combination with a combustion engine. The circuit diagram shows in an exemplary manner the respective transmissions of the individual gear stages and the gear jumps to the next higher gear to be determined, wherein the transmission comprises a transmission-ratio spread of 8.1. Also FIG. 5 shows that it is possible with a sequential shifting mode to prevent double shifting or range shift operations because two adjoining gear stages share one switching element.

At this point, it should be mentioned that in all example embodiments of the invention described the switching elements A, B, C, D, E, as well as the switching elements K0, K1, are preferably designed as jaw clutches, and the switching element F is designed as a jaw brake. In all example embodiments of the invention, it is also possible that the first switching element C and the second switching element B and/or the third switching element D and the fourth switching element E and/or the fifth switching element A and the sixth switching element F and/or the seventh switching element K1 and the eighth switching element K0 can be operated, respectively by means of a double-acting actuator. As a result, one pair of switching elements, respectively, can be operated by means of a single actuator. This results in a simplified structure and is able to reduce the required installation space and production costs.

The circuit diagrams shown in FIGS. 3 and 5 demonstrate that power shifting takes place via the electric motor when driving in combination with a combustion engine. In case switching element F is closed (shifting from the first to the second gear and from the second to the third gear) or switching element A is closed (for example, shifting from the seventh to the eighth gear) power shifting takes place in electromotive operation and in case switching element D is closed (shifting from the third to the fourth gear and from the fourth to the fifth gear) or switching element E is closed (for example, shifting from the tenth to the eleventh gear) power shifting takes place in generator operation, wherein the combustion engine 1 continues to be under load except when switching element F is closed.

It is also possible without any interruption in power to activate the combustion engine 1 when using only the electric driving mode while switching element F, which is designed as a jaw brake, is closed. After synchronizing gears one to three, and the gear resulting from closing the sixth switching element F and the second switching element E, the combustion engine 1 can be activated without experiencing any interruption in power.

In order to start the combustion engine 1 when using only the electric driving mode, the switching element F can be released and, preferably, in order to utilize the transmission of the front-mounted gear set VSR, the switching element B or the switching element C can be closed after prior synchronization. Then, the combustion engine 1 can be started via the electric motor. Subsequently, after prior synchronization, the jaw brake F can be closed again and driving can be continued with the combustion engine in the first (C and F closed) or second gear (B and F closed). Naturally, it is also possible after respective synchronization to continue driving with the combustion engine in all other gears, including the gear not listed in the switching logic (E and F closed).

Furthermore, FIGS. 3 and 5 indicate that it is also possible to use only the electric driving mode (starting in forward/backward driving mode). In this case the purely electric gear has a transmission of 5.00 or 4.33. Depending on the total transmission and speed limit of the electric motor, speeds of more than 50 km/h can be achieved.

REFERENCE SIGNS 1. combustion engine
2. control system
3. electric energy storage device
4. transmission input shaft
5. transmission output shaft
6. torsional vibration damper
EM1 first electric motor
EM2 second electric motor
P1 first planetary gear
P2 second planetary gear
P3 third planetary gear
P4 fourth planetary gear
HRS main gear set
W1 first shaft of the main gear set
W2 second shaft of the main gear set
W3 third shaft of the main gear set
W4 fourth shaft of the main gear set
VRS front-mounted gear set
WVS1 first shaft of the front-mounted gear set
WVS2 second shaft of the front-mounted gear set
WVS3 third shaft of the front-mounted gear set
WVS4 fourth shaft of the front-mounted gear set
C first switching element
B second switching element
D third switching element
E fourth switching element
A fifth switching element
F sixth switching element
K1 seventh switching element
K0 eighth switching element
SO1 sun gear of the first planetary gear
ST1 planet carrier of the first planetary gear
HO1 ring gear of the first planetary gear
SO2 sun gear of the second planetary gear
ST2 planet carrier of the second planetary gear
HO2 ring gear of the second planetary gear
SO3 sun gear of the third planetary gear
ST3 planet carrier of the third planetary gear
HO3 ring gear of the third planetary gear
SO4 sun gear of the fourth planetary gear
ST4 planet carrier of the fourth planetary gear
HO4 ring gear of the fourth planetary gear

The invention claimed is:
1. A transmission, comprising
an input shaft;
an output shaft;
a main gear set comprising a first single planetary gear set, a second single planetary gear set, and a first shaft, a second shaft, a third shaft, and a fourth shaft, wherein rotational speeds of the first shaft, second shaft, third shaft, and fourth shaft vary linearly with each other in an increasing or decreasing rotational speed order of the first shaft, second shaft, third shaft, and fourth shaft;
a first power path between the input shaft and the main gear set, comprising a first transmission ratio;
a second power path between the input shaft and the main gear set, comprising a second transmission ratio smaller than the first transmission ratio; and
a third power path between the input shaft and the main gear set, comprising a third transmission ratio smaller than the second transmission ratio,
wherein at least one of the first shaft, second shaft, third shaft, and fourth shaft is connected with an electric motor,
wherein the first shaft is capable of being connected with the first power path via a first switching element and with the third power path via a second switching element, wherein the second shaft is capable of being connected with the first power path via a third switching element and with the third power path via a fourth switching element, wherein the third shaft is constantly connected with the transmission output shaft, wherein the fourth shaft is capable of being connected with the second power path via a fifth switching element and is capable of being fixed by a sixth switching element.

2. The transmission according to claim 1, wherein the electric motor is connected with the first shaft constantly or in an On and Off switch mode, directly or through a transmission.

3. The transmission according to claim 1, further comprising twelve forward gears by selectively engaging in pairs two of the first switching element through the sixth switching element, wherein eleven of the twelve forward gears is capable of being switched in power shifting mode and without range shifting, wherein
- a first forward gear is connected by closing the sixth switching element and the first switching element,
- a second forward gear is connected by closing the sixth switching element and the second switching element,
- a third forward gear is connected by closing the sixth switching element and the third switching element,
- a fourth forward gear is connected by closing the third switching element and the second switching element,
- a fifth forward gear is connected by closing the third switching element and the first switching element,
- a sixth forward gear is connected by closing the third switching element and the fifth switching element,
- a seventh forward gear is connected by closing the first switching element and the fifth switching element,
- an eighth forward gear is connected by closing the second switching element and the fifth switching element,
- a ninth forward gear is connected by closing the fourth switching element and the fifth switching element,
- a tenth forward gear is connected by closing the second switching element and the fourth switching element,
- an eleventh forward gear is connected by closing the first switching element and the fourth switching element, and
- a twelfth gear is connected by closing the sixth switching element and the fourth switching element.

4. The transmission according to claim 1, wherein the transmission output shaft is arranged coaxially to the transmission input shaft,
- wherein the first power path comprises a first planetary gear set for delivering a speed that is smaller than the speed of the transmission input shaft,
- wherein the first switching element and the third switching element are connected with a shaft of the first planetary gear set,
- wherein the second power path is a direct drive to which the fifth switching element is connected,
- wherein the third power path comprises a second planetary gear set for delivering a speed that is greater than the speed of the transmission input shaft,
- wherein the second switching element and the fourth switching element are connected to a shaft of the second planetary gear set,
- wherein the first and the second planetary gear sets are coupled twice,
- wherein a shaft of one of the first planetary gear set and the second planetary gear set is fixed and a shaft of one of the first planetary gear set and the second planetary gear set is connected with the transmission input shaft constantly or via a seventh switching element.

5. The transmission according to claim 4, wherein the first planetary gear set involves a minus gear set designed as an underdrive planetary gear set, the first planetary gear set comprising a fixed sun gear and a ring gear that is connected with a planet carrier of the second planetary gear set,
- wherein the first switching element and the third switching element are connected with a planet carrier of the first planetary gear set,
- wherein the second planetary gear set involves a minus gear set designed as an overdrive planetary gear set, the second planetary gear set comprising a sun gear that is fixed, a planet carrier that is constantly connected with the transmission input shaft or that is capable of being connected with the transmission input shaft via the seventh switching element, and a ring gear that is connected with the second switching element and the fourth switching element.

6. The transmission according to claim 5, wherein the planet carrier of the first planetary gear set is capable of being detachably connected with a planet carrier of the first single planetary gear set of the main gear set via the third switching element,
- wherein the planet carrier of the first single planetary gear set of the main gear set is connected with a ring gear of the second single planetary gear set of the main gear set, and the ring gear of the second planetary gear set is capable of being detachably connected with the planet carrier of the first single planetary gear set of the main gear set via the fourth switching element, and via the second switching element with a sun gear of the first single planetary gear set of the main gear set, and through the first switching element, the planet carrier of the first planetary gear set is also capable of being detachably connected with the sun gear of the first single planetary gear set of the main gear set,
- wherein the transmission input shaft is capable of being detachably connected with a sun gear of the second single planetary gear set of the main gear set via the fifth switching element,
- wherein a planet carrier of the second single planetary gear set of the main gear set is constantly connected with the transmission output shaft and the sun gear of the second single planetary gear set of the main gear set is capable of being fixed by the sixth switching element.

7. The transmission according to claim 6, wherein the ring gear of the first single planetary gear set of the main gear set is connected with the sun gear of the second single planetary gear set of the main gear set.

8. The transmission according to claim 6, wherein the ring gear of the first single planetary gear set of the main gear set is connected with the planet carrier of the second single planetary gear set of the main gear set.

9. A hybrid power train for a motor vehicle comprising
a combustion engine;
an electric motor; and
a transmission, comprising:
- an input shaft;
- an output shaft;
- a main gear set comprising a first single planetary gear set, a second single planetary gear set, and a first shaft, a second shaft, a third shaft, and a fourth shaft, wherein rotational speeds of the first shaft, second shaft, third shaft, and fourth shaft vary linearly with each other in an increasing or decreasing rotational speed order of the first shaft, second shaft, third shaft, and fourth shaft;

a first power path between the input shaft and the main gear set, comprising a first transmission ratio;

a second power path between the input shaft and the main gear set, comprising a second transmission ratio smaller than the first transmission ratio; and a third power path between the input shaft and the main gear set, comprising a third transmission ratio smaller than the second transmission ratio, wherein at least one of the first shaft, second shaft, third shaft, and fourth shaft is connected with an electric motor, wherein the first shaft is capable of being connected with the first power path via a first switching element and with the third power path via a second switching element, wherein the second shaft is capable of being connected with the first power path via a third switching element and with the third power path via a fourth switching element, wherein the third shaft is constantly connected with the transmission output shaft, wherein the fourth shaft is capable of being connected with the second power path via a fifth switching element and is capable of being fixed by a sixth switching element.

10. The hybrid power train according to claim 9, further comprising a second electric motor in the form of a starter or starter generator, wherein the second electric motor is connected with the combustion engine directly or through a transmission, or is detachably connected via an eighth switching element.

11. The hybrid power train according to claim 9, wherein at least one of the first switching element through the sixth switching element is operable through a double-acting actuator.

12. The hybrid power train according to claim 9, wherein the electric motor is connected with the first shaft constantly or in an On and Off switch mode, directly or through a transmission.

13. The hybrid power train according to claim 9, further comprising twelve forward gears by selectively engaging in pairs two of the first switching element through the sixth switching element, wherein eleven of the twelve forward gears is capable of being switched in power shifting mode and without range shifting, wherein a first forward gear is connected by closing the sixth switching element and the first switching element, a second forward gear is connected by closing the sixth switching element and the second switching element, a third forward gear is connected by closing the sixth switching element and the third switching element, a fourth forward gear is connected by closing the third switching element and the second switching element, a fifth forward gear is connected by closing the third switching element and the first switching element, a sixth forward gear is connected by closing the third switching element and the fifth switching element, a seventh forward gear is connected by closing the first switching element and the fifth switching element, an eighth forward gear is connected by closing the second switching element and the fifth switching element, a ninth forward gear is connected by closing the fourth switching element and the fifth switching element, a tenth forward gear is connected by closing the second switching element and the fourth switching element, an eleventh forward gear is connected by closing the first switching element and the fourth switching element, and a twelfth gear is connected by closing the sixth switching element and the fourth switching element.

14. The hybrid power train according to claim 9, wherein the transmission output shaft is arranged coaxially to the transmission input shaft, wherein the first power path comprises a first planetary gear set for delivering a speed that is smaller than the speed of the transmission input shaft, wherein the first switching element and the third switching element are connected with a shaft of the first planetary gear set, wherein the second power path is a direct drive to which the fifth switching element is connected, wherein the third power path comprises a second planetary gear set for delivering a speed that is greater than the speed of the transmission input shaft, wherein the second switching element and the fourth switching element are connected to a shaft of the second planetary gear set, wherein the first and the second planetary gear sets are coupled twice, wherein a shaft of one of the first planetary gear set and the second planetary gear set is fixed and a shaft of one of the first planetary gear set and the second planetary gear set is connected with the transmission input shaft constantly or via a seventh switching element.

15. The hybrid power train according to claim 14, wherein the first planetary gear set involves a minus gear set designed as an underdrive planetary gear set, the first planetary gear set comprising a fixed sun gear and a ring gear that is connected with a planet carrier of the second planetary gear set, wherein the first switching element and the third switching element are connected with a planet carrier of the first planetary gear set, wherein the second planetary gear set involves a minus gear set designed as an overdrive planetary gear set, the second planetary gear set comprising a sun gear that is fixed, a planet carrier that is constantly connected with the transmission input shaft or that is capable of being connected with the transmission input shaft via the seventh switching element, and a ring gear that is connected with the second switching element and the fourth switching element.

16. The hybrid power train according to claim 15, wherein the planet carrier of the first planetary gear set is capable of being detachably connected with a planet carrier of the first single planetary gear set of the main gear set via the third switching element, wherein the planet carrier of the first single planetary gear set of the main gear set is connected with a ring gear of the second single planetary gear set of the main gear set, and the ring gear of the second planetary gear set is capable of being detachably connected with the planet carrier of the first single planetary gear set of the main gear set via the fourth switching element, and via the second switching element with a sun gear of the first single planetary gear set of the main gear set, and through the first switching element, the planet carrier of the first planetary gear set is also capable of being detachably connected with the sun gear of the first single planetary gear set of the main gear set, wherein the transmission input shaft is capable of being detachably connected with a sun gear of the second single planetary gear set of the main gear set via the fifth switching element, wherein a planet carrier of the second single planetary gear set of the main gear set is constantly connected with the transmission output shaft and the sun gear of the second single planetary gear set of the main gear set is capable of being fixed by the sixth switching element.

17. The hybrid power train according to claim 16, wherein the ring gear of the first single planetary gear set of the main gear set is connected with the sun gear of the second single planetary gear set of the main gear set.

18. The hybrid power train according to claim 16, wherein the ring gear of the first single planetary gear set of the main gear set is connected with the planet carrier of the second single planetary gear set of the main gear set.

19. The hybrid power train according to claim 10, wherein at least one of the first switching element through the eighth switching element is operable through a double-acting actuator.

* * * * *